United States Patent [19]
Selz

[11] Patent Number: 5,423,428
[45] Date of Patent: Jun. 13, 1995

[54] PALLETIZED LOAD COVER FOR USE WITH BELTED PALLETS

[76] Inventor: John C. Selz, 2549 Broadway, Toledo, Ohio 43609

[21] Appl. No.: 252,733

[22] Filed: Jun. 2, 1994

[51] Int. Cl.$^6$ .................................................. B65D 19/00
[52] U.S. Cl. ................................ 206/597; 206/386; 217/66
[58] Field of Search ................. 206/386, 597; 217/66; 108/53.1, 53.5

[56] References Cited

U.S. PATENT DOCUMENTS

| | | | |
|---|---|---|---|
| 2,442,266 | 5/1948 | Davis | 280/179 |
| 2,830,783 | 4/1958 | Halvarson | 248/361 |
| 3,416,762 | 12/1968 | Headrick | 248/361 |
| 3,467,999 | 9/1969 | Bjocksten et al. | 24/245 |
| 3,685,799 | 8/1972 | Wriedt | 254/51 |
| 3,906,591 | 9/1975 | Boiardi | 206/597 |
| 4,008,669 | 2/1977 | Sumrell | 105/484 |
| 4,050,664 | 9/1977 | Daley | 248/346 |
| 4,085,846 | 4/1978 | Williams | 206/600 |
| 4,227,286 | 10/1980 | Holmberg | 24/68 CD |
| 4,290,369 | 9/1981 | Propst et al. | 108/53.3 |
| 4,305,505 | 12/1981 | Hickey | 206/599 |
| 4,358,232 | 11/1982 | Griffith | 410/100 |
| 4,367,572 | 1/1983 | Zielenski | 24/301 |
| 4,428,306 | 1/1984 | Dresen et al. | 108/53.3 |
| 4,569,108 | 2/1986 | Schwab | 24/17 R |
| 4,579,489 | 4/1986 | Sarantitis | 410/80 |
| 4,604,014 | 8/1986 | Frano | 411/338 |
| 4,801,024 | 1/1989 | Flum et al. | 206/597 |
| 4,842,236 | 1/1989 | Yonts | 248/499 |
| 4,887,731 | 12/1989 | Pett et al. | 220/1.5 |
| 4,913,608 | 4/1990 | Royball | 410/103 |
| 4,995,525 | 2/1991 | Kehrer | 220/85 R |
| 5,026,230 | 6/1991 | Dolezych et al. | 410/100 |
| 5,035,558 | 7/1991 | Prosen | 410/96 |
| 5,046,434 | 9/1991 | Breezer et al. | 108/51.1 |
| 5,063,641 | 11/1991 | Chuan | 24/197 |
| 5,123,541 | 6/1992 | Giannini et al. | 206/600 |
| 5,173,996 | 12/1992 | Chou | 24/68 CD |
| 5,197,396 | 3/1993 | Breezer et al. | 108/56.3 |
| 5,323,903 | 6/1994 | Bush et al. | 206/597 |

*Primary Examiner*—David T. Fidei
*Attorney, Agent, or Firm*—David C. Purdue; John C. Purdue

[57] ABSTRACT

A palletized load cover is disclosed. The cover includes at least one elastic strap which is held captive on the cover. Integral connectors are provided on each end of the strap and the connectors cooperate with a conventional pallet including at least two retractable belts which can be locked against further unwinding when unwound. Guides are provided on the cover to restrict lateral movement of the strap while permitting limited longitudinal movement of the strap. The connectors provided on each end of the elastic strap are operable to releasably lock with cooperating connectors provided on distal ends of the pallet belts. With the belt connectors locked to the strap connectors at each end of the strap, the belts are pulled so that the belt retracts and is locked against unwinding. The elasticity of the strap makes it possible, with conventional belt retractor mechanisms, to achieve an unprecedented level of strap tightness, thereby making a palletized load secured with a cover according to the invention significantly more secure than has been possible with prior art load covers. In addition, the strap connects belts from opposed sides of the pallet and maintains or restores equal tension in the two belts, continuously. In one embodiment, a single elastic strap, in the form of a closed loop, is provided on the cover and it is operable to equalize tension in four pallet belts secured to it.

7 Claims, 4 Drawing Sheets

PALLETIZED LOAD COVER FOR USE WITH BELTED PALLETS

BACKGROUND OF THE INVENTION

1. Field of the Invention

The present invention relates generally to reusable pallet systems and, more specifically, to improved covers for palletized loads as well as the combination of such covers with pallets including retractable belt systems.

2. Description of the Prior Art

Numerous patents disclosing pallets and various tie down devices were noted in a preliminary search directed to the subject matter of this invention. They are U.S. Pat. Nos. 2,442,266; 2,830,783; 3,416,762; 3,467,999; 3,685,799; 4,008,669; 4,050,664; 4,085,846; 4,227,286; 4,290,369; 4,305,505; 4,358,232; 4,367,572; 4,428,306; 4,569,108; 4,579,489; 4,604,014; 4,842,236; 4,887,731; 4,913,608; 4,995,525; 5,026,230; 5,035,558; 5,046,434; 5,063,641; 5,123,541; 5,173,996; and 5,197,396.

Pallets and pallet systems comprising pallets and load covers are well known and are widely used today for shipping a myriad of different items. Loads are secured to pallets in a variety of different ways. It is a fairly common practice today to position a load on a pallet and shrink wrap the load and pallet together to unitize the load and pallet. Some pallet loads are placed on pallets and not secured to the pallet, other than by gravity.

In the automotive industry, which is increasingly interested in recycling shipping materials including pallets, durable, reusable pallets have been combined with durable, reusable palletized load covers to reduce waste associated with the previously mentioned load securement means. Heretofore, such pallets covers have been secured to the pallets with seat belts. Specifically, with reference to FIG. 9 of the drawings, a pallet, indicated generally at 900, has a plurality of corner feet 902 and side feet 904. Each side foot 904 houses a conventional seat belt retractor mechanism (illustrated in FIG. 10 and discussed below in connection therewith) from which a conventional, virtually non-elastic, seat belt 906 extends through an opening, indicated at 908, in each of the side feet 904. A conventional male seat belt buckle 910 is securely connected to a distal end 912 of the belt in a conventional manner.

A conventional palletized load cover is indicated generally at 914. Four female seat belt buckles 916 are secured to the cover 914 with threaded fasteners 918. The combination consisting of the pallet 900 and cover 914 are available commercially from Robinson Industries. A belted pallet is also available from Penda Corporation. The combination of the cover 914 and the pallet 900 is used to secure a pallet load, indicated at L, as follows. The load L is positioned on the pallet 900, as shown in FIG. 9. One of the seat belts 906 is withdrawn from a seat belt retractor mechanism in one of the side feet 904, as indicated by arrow 920 as far as necessary in order to insert and lock the male buckle 910 in the female buckle 916. This procedure is repeated with the remaining three belts 906 until all of the male buckles 910 are locked into the female buckles 916. The belts 906 are cinched downwardly, towards the side feet 904, so that slack in the belts 906 can be taken up or rewound onto the associated retractor mechanism. As discussed below, such retractor mechanisms typically have light duty springs which retract the belt, but only when the belts are under virtually no tension. As the belts 906 retract, a conventional pawl and ratchet assembly (described below in connection with FIG. 10) permits the belts 906 to be retracted but prevents the belts 906 from being withdrawn from the retractor mechanism more than about one quarter of an inch. This procedure will tighten the belts 906 somewhat, but experience has proven that an unacceptable amount of slack remains in the belts because of deficiencies inherent in the system described above.

Part of the problem with the system described above can be attributed to the belt retractors which are housed in the side feet 904 of the pallet 900. Such a retractor is illustrated in FIG. 10 and is indicated generally by reference number 934. The retractor 934 comprises a housing 936 which includes an integral depending mounting flange 938 for securing the retractor 934, for example, inside a side foot 904 of a pallet 900 (FIG. 9). A belt 928 is wound about a rotatably mounted spool (not shown) in the retractor 934 (FIG. 10). A retractor spring 940 is connected to the spool in a known fashion so that can rotate the spool to rewind the belt 928. The spring, in conventional retractors, applies very little torque to the spool so that the belt will rewind only when there is virtually no unwinding tension applied to the belt 928. The retractor 934 includes a conventional ratchet wheel 942 and a pawl 944 which cooperate in a known fashion so that:

- the belt 928 may be entirely or partially unwound from the spool;
- when a given portion of the belt 928 has been unwound and the belt is allowed to go slack, the pawl 944 becomes operable to engage the ratchet wheel 942 to prevent further unwinding of the belt 928 and, with the given portion of the belt unwound, the belt 928, if slack, will rewind on the spool under the action of the retractor spring 940 but the ratchet wheel 942 and the pawl 944 prevent unwinding of the belt 928 more than about one quarter of one inch; and
- when all or most of the belt 928 has been rewound onto the spool, the pawl 944 is rendered inoperable to prevent unwinding of the belt 928.

In the context of the pallet 900 and load cover 914 (FIG. 9), the retractor 934, and specifically the retractor spring 940, are simply inadequate to lock the belt 928 against unwinding with sufficient tautness in the belt 928 to properly secure the load L between the pallet 900 and the cover 914. Accordingly, there remains a need for a system for securing a palletized load cover to a pallet so that a load carried on the pallet is held tight and fast to the pallet.

SUMMARY OF THE INVENTION

The present invention is a palletized load cover with integral connectors which cooperate with a conventional pallet including at least two retractable belts which can be locked against further unwinding when unwound. The load cover includes at least one elastic strap which is held captive on the cover. Guides are provided on the cover to restrict lateral movement of the strap while permitting limited longitudinal movement of the strap. Connectors are provided on each end of the elastic strap and these connectors are operable to releasably lock with cooperating connectors provided on distal ends of the belts. With the belt connectors locked to the strap connectors at each end of the strap, the belts are pulled so that the belt retracts and is locked against unwinding. The elasticity of the strap makes it possible, with conventional belt retractor mechanisms, to achieve an unprecedented level of strap tightness, thereby making a palletized load secured with a cover according to the invention significantly more secure than has been possible with prior art load covers. In addition, the strap connects belts from opposed sides of the pallet and maintains or restores equal tension in the two belts, continuously. In one embodiment, a single elastic strap, in the form of a closed loop, is provided on the cover and it is operable to equalize tension in four pallet belts secured to it.

Accordingly, it is an object of the present invention to provide a palletized load cover which can be used to secure a load on a belted pallet more tightly than has been possible heretofore.

It is a further object of the present invention to provide a palletized load cover which will maintain and restore equal tension in belts attached to opposite sides of the cover.

Other objects and advantages of the invention will be apparent to those skilled in the art upon reference to the following detailed description of the invention and the several Figures of the drawing.

BRIEF DESCRIPTION OF THE DRAWING FIGURES

DETAILED DESCRIPTION OF THE INVENTION

Figure 1:
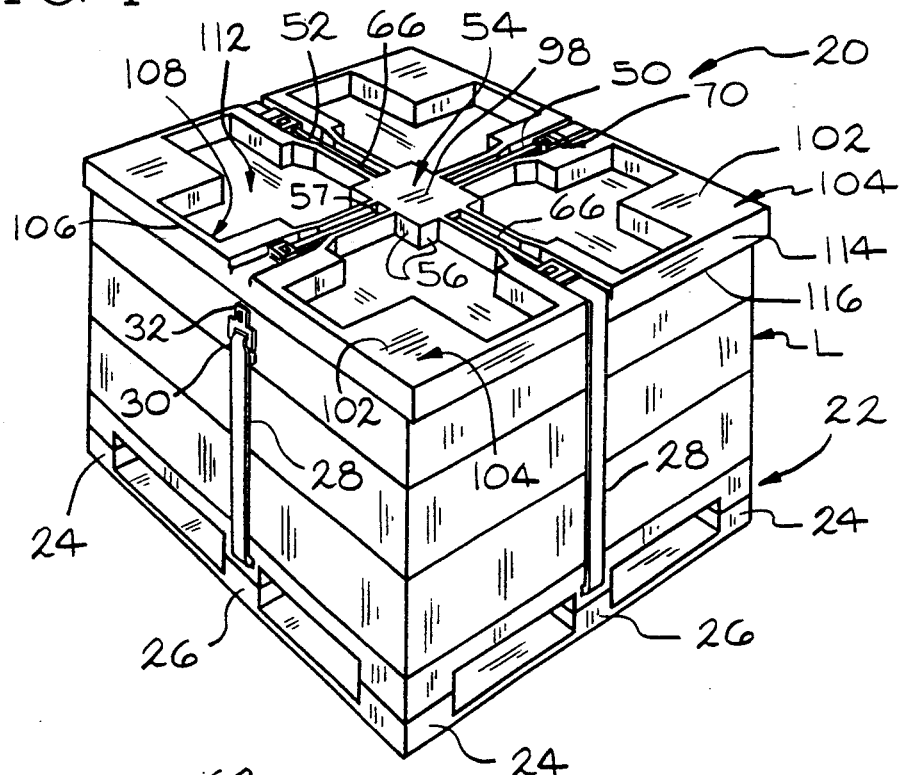
FIG. 1 is a perspective view of a palletized load cover, according to the invention, holding a load in place on a pallet.
Figure 10:
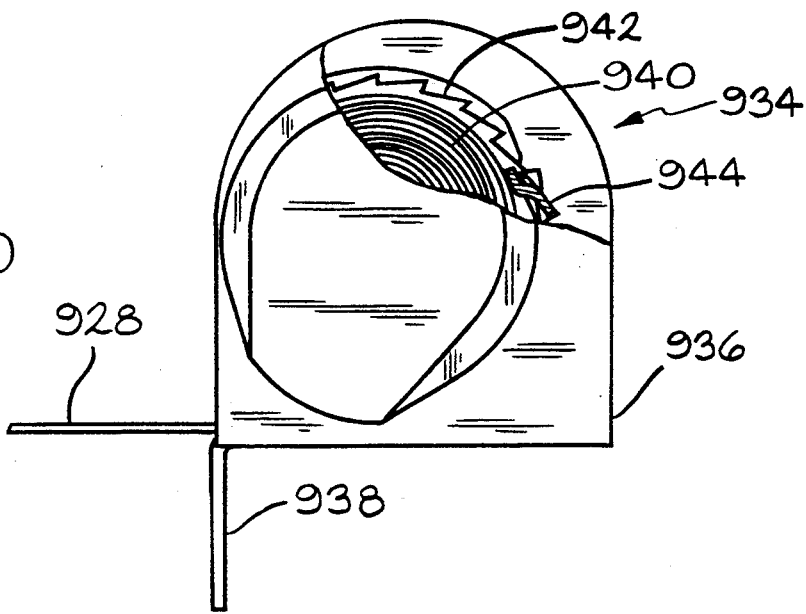
FIG. 10 is a side view, partially broken away, of a prior art seat belt retractor mechanism.

Referring now to FIG. 1, a palletized load cover according to the invention is indicated generally at 20. The cover 20 is shown in place over a load L which is positioned on a pallet indicated generally at 22. The pallet 22 is a conventional pallet which has corner feet 24 and side feet 26. Pallets are commercially available which correspond with the pallet 22 and include a belt 28 which can be retracted within the side feet 26. Each belt 28 has a distal end 30 and a male buckle 32 is secured to the distal end 30 of each belt 28. Inside each side foot 26 there is housed a belt retractor mechanism corresponding generally with the prior art retractor mechanism 934 illustrated in FIG. 10.

The cover 20 is a generally planar body which has a length and width corresponding generally with the length and width of the pallet 22. It is preferred that the cover 20 be produced by thermoforming or molding a suitable plastic material in a die. There are many plastics which are suitable for thermoforming and the selection of a suitably durable and strong material is well within grasp of one skilled in the art of thermoforming. A preferred material for the cover, if thermoformed, is polyethylene. Other materials may be substituted, if desired. If molded, the cover is preferably made of a foamed polyethylene.

A first elastic strap 50 and a second elastic strap 52 are held captive on the cover 20. A raised center portion 54 has four side walls 56. There is an opening, indicated at 57, in the center of each side wall 56 and the elastic strap 50 extends through the openings 57 in two opposed side walls 56 while the elastic strap 52 extends through the openings 57 in the other two opposed side walls 56.

Figure 2:
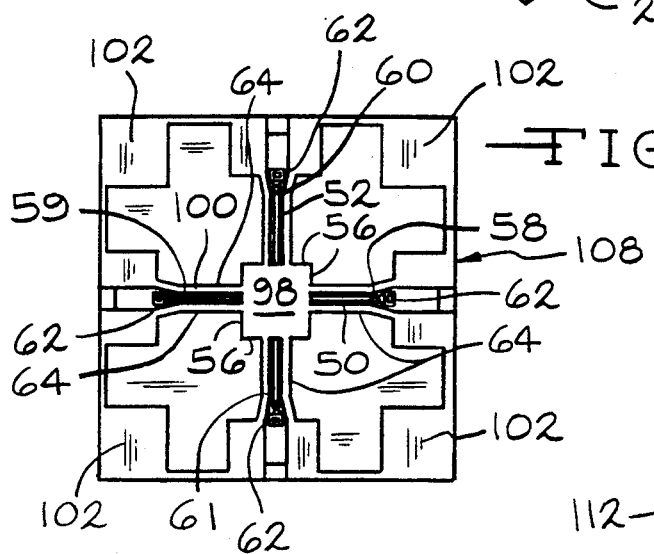
FIG. 2 is a top view of the load cover illustrated in FIG. 1.

The elastic strap 50 has a first end 58 (FIG. 2) and a second end 59. The elastic strap 52 has a first end 60 and a second end 61. A female buckle 62 is secured to each end of the strap 50 and also to each end of the strap 52, in a manner described in more detail below with reference to FIGS. 4 and 5.

Figure 3:
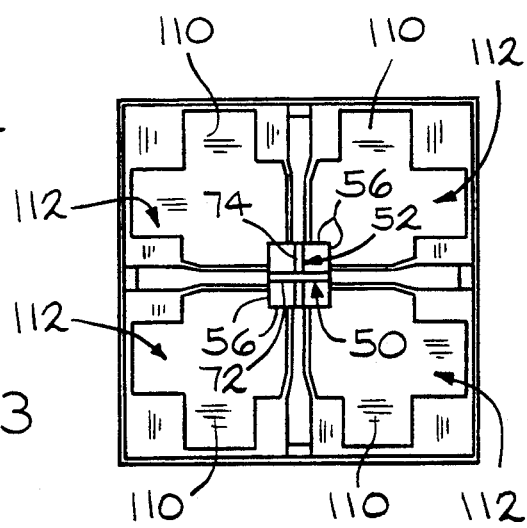
FIG. 3 is a bottom view of the load cover illustrated in FIGS. 1 and 2.
Figure 5:
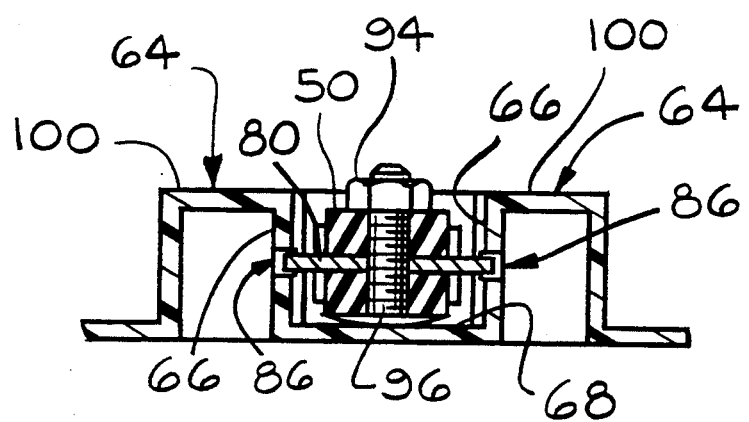
FIG. 5 is a cross sectional view taken along the line 5—5 of FIG. 4.

Extending outwardly from each of the side walls 56 of the raised center portion 54, adjacent to the opening in the side wall 56, are a pair of ribs 64. Each of the ribs 64 has a wall portion which constitutes a channel wall 66 (FIG. 5). The channel walls 66 are connected to each other by a channel bottom 68 which is an integral portion of the cover 20. The channel walls 66 and channel bottoms 68 define four channels, one of which is indicated at 70 in FIG. 1, in which portions of the elastic straps 50 and 52 are carried. The channels 70 extend outwardly from the center portion 54. A central portion 72 (FIG. 3) of the strap 50 and a central portion 74 of the strap 52 extend between opposed side walls 56 of the center portion 54.

Together, the side walls 56 of the center portion 54 and the female buckles 62 constitute stop means which prevent the elastic straps 50 and 52 from being removed from the cover 20. The female buckles 62 have a lateral dimension which exceeds the size of the openings 57 in the side walls 56 of the center portion 54 of the cover 20. With the female buckles 62 secured to the belts 50 and 52 in the manner shown in FIGS. 1 through 5, the belts 50 and 52 can not be removed from the cover 20.

Figure 4:
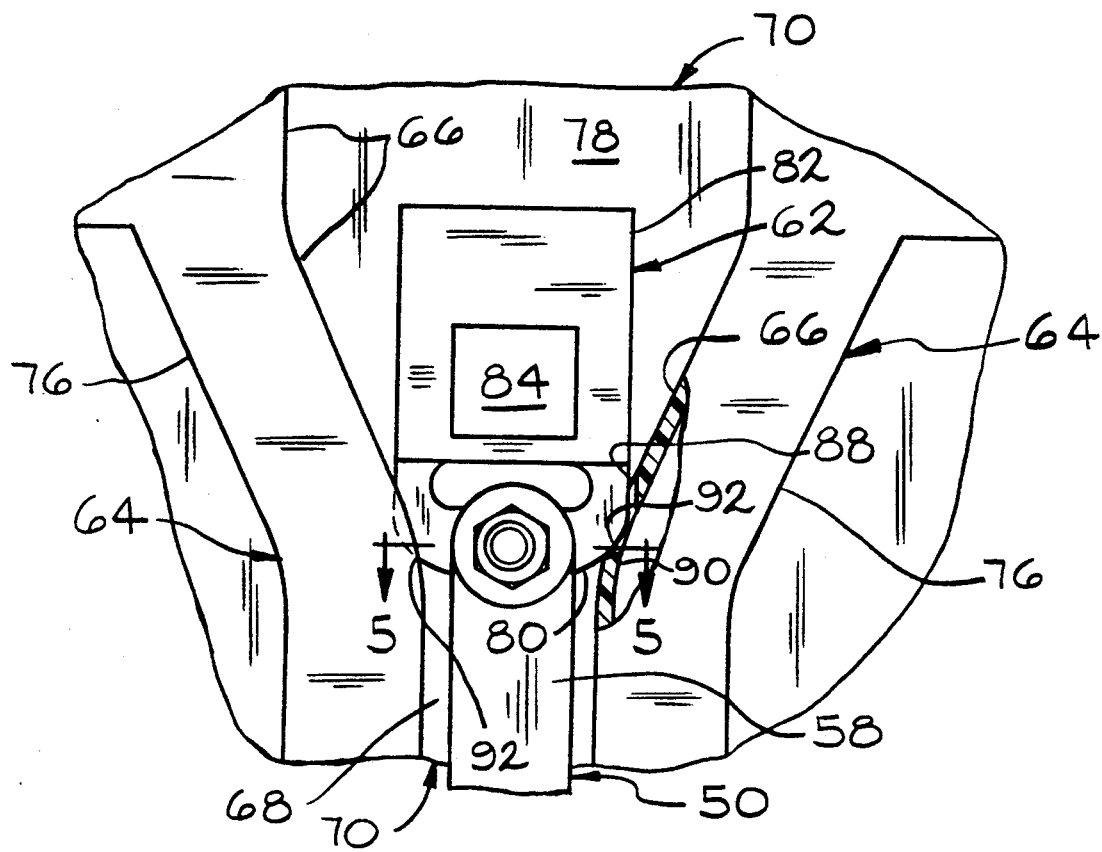
FIG. 4 is a detail view of a channel portion of the load cover illustrated in FIGS. 1, 2 and 3.

The channels 70 are relatively narrow, adjacent to the raised center portion 54. In this area, the side walls 66 which form each channel 70 are essentially parallel and spaced apart a distance which is slightly greater than the largest lateral dimension of the straps 50 and 52 so that they can move freely in the channels 70. As shown in FIG. 4, a middle portion 76 of each rib 64 diverges from the adjacent rib 64 and so do the side walls 66 of each adjacent rib 64 to define an outer channel region 78 which is wider than the width of the buckle 62 which can rest therein.

With further reference to FIG. 4, the buckle 62 is conventional and comprises a connector plate 80 to which a buckle receiving housing 82 is connected. The housing 82 is operable to receive the buckle 32 (FIG. 1) and to lock the two together in a known fashion. A release button 84 (FIG. 4), when depressed, unlocks the buckle 32 from the buckle 62, also in a known fashion. Means for securing the buckle 62 in the channel 70 are provided in each channel 70. Specifically, a slot, indicated at 86 in FIG. 5, is provided in each adjacent side wall 66, near the point where the side walls 66 begin to diverge. The slot 86 extends from a point 88 on the side wall 66, which is spaced from the opposed side wall 66 a distance greater than the width of the buckle plate 80, to a point 90 of the side wall 66 which is spaced from the opposed side wall 66 a distance less than the width of the buckle plate 80. Consequently, the buckle 62 and, specifically, the buckle plate 80 can be received in the two opposed slots 86. It is preferred that the length of the straps 50 and 52 be controlled so that, when the plates 80 of the buckles 62 at each end of either strap 50 or strap 52 are received in the slots 86, the strap 50 or 52 will exert a mild tension on the buckles 62, tending to pull the buckle plates 80 into contact and engagement with a rear portion 92 of the slots 86. In this manner, the buckles 62, when not in use, are restrained against undesired movement.

As shown in FIG. 5, the buckle plate 80 is secured to the end 58 of the strap 50 by threaded fasteners comprising a nut 94 and a bolt 96. The bolt 96 extends through an aperture in the end of the strap 50 and a corresponding aperture in the buckle plate. A preferred elastic strap for use in the present invention is available under the trademark "Poly-Strap." These straps are available in various lengths and come with apertures through each end. In connecting a buckle plate to the end of a Poly-Strap, a slot is cut in the end of the Poly-Strap, transverse to the pre-formed aperture, to receive the buckle plate 80, as shown in FIG. 5. The pre-formed aperture in each end of the strap is preferably enlarged to receive a suitably sized bolt, such as the bolt 96.

It is preferred that the ribs 64 be sized, relative to the strap 50, the bolt 96 and the nut 94 so that the all of the last three named elements are fully recessed in the channel 70, notwithstanding the fact that FIG. 5 shows a portion of the nut 94 and the bolt 96 extending above the upper surface of the rib 64. When the strap 50, the bolt 96 and the nut 94 are recessed, a pallet can be stacked on top of a load cover 20 and not interfere with the belts or the hardware used to secure a buckle to each end of the belts.

Referring again to FIGS. 1 and 2, it is preferred that the cover 20 be formed so that an upper surface 98 of the raised center portion 54 is substantially planar and is substantially co-planar with an upper surface 100 (FIGS. 2 and 5) of each rib 64, as well as with an upper surface 102 (FIGS. 1 and 2) of a corner section 104 provided in each corner of the cover 20. In fact, it is preferred that the cover 20 be configured so that, instead of surfaces 98, 100 and 102 being planar, as they have been illustrated for simplicity, they are slightly convex, when viewed from the top, as in FIGS. 1 and 2, and slightly concave, when viewed from the bottom, as in FIG. 3. In other words, it is preferred, with reference to FIG. 1, that the upper surface 98 of the raised central portion 54 be slightly higher than the upper surfaces 102 of the corner portions 104 and, further, that the upper surfaces 100 of the ribs 64 extend outwardly from and slightly downwardly from the upper surface 98 of the raised central portion 54. In the rest of this detailed description as well as the appended claims, substantially planar is intended to mean a surface which is planar, somewhat convex, or somewhat concave.

In the embodiment illustrated in FIGS. 1 through 5, the upper surfaces 98, 100 and 102 as well as upper surfaces 106 of side ribs 108 which extend between the ribs 64 and the corner sections 104, define a first surface which is substantially planar. This first surface is operable to support a pallet on top of the cover 20 and prevent interference between the pallet and the straps 50 and 52 and elements connected thereto. A second substantially planar surface is defined in the cover 20 by bottom surfaces 110 (FIG. 3) of floor portions 112 of the cover 20. It is preferred that the straps 50 and 52, when taut, and elements connected thereto are contained entirely between these first and second substantially planar surfaces so that the straps 50 and 52, when stretched, can move a limited amount in a longitudinal direction within the channels 70, whereby the position of the straps will self adjust to maintain or restore equal tension in the belts 28 connected to each end of one of the straps 50 or 52.

The cover 20 has side walls 114 with bottom edges 116. It is preferred that the bottom edges 116 of the side walls terminate below the bottom surfaces 110 of the floor portions of the cover 20. With this configuration, the side walls 114 can engage a portion (not shown) of the load L to provide additional stability in the combination of the pallet 22, the load L and the cover 20.

Figure 9:
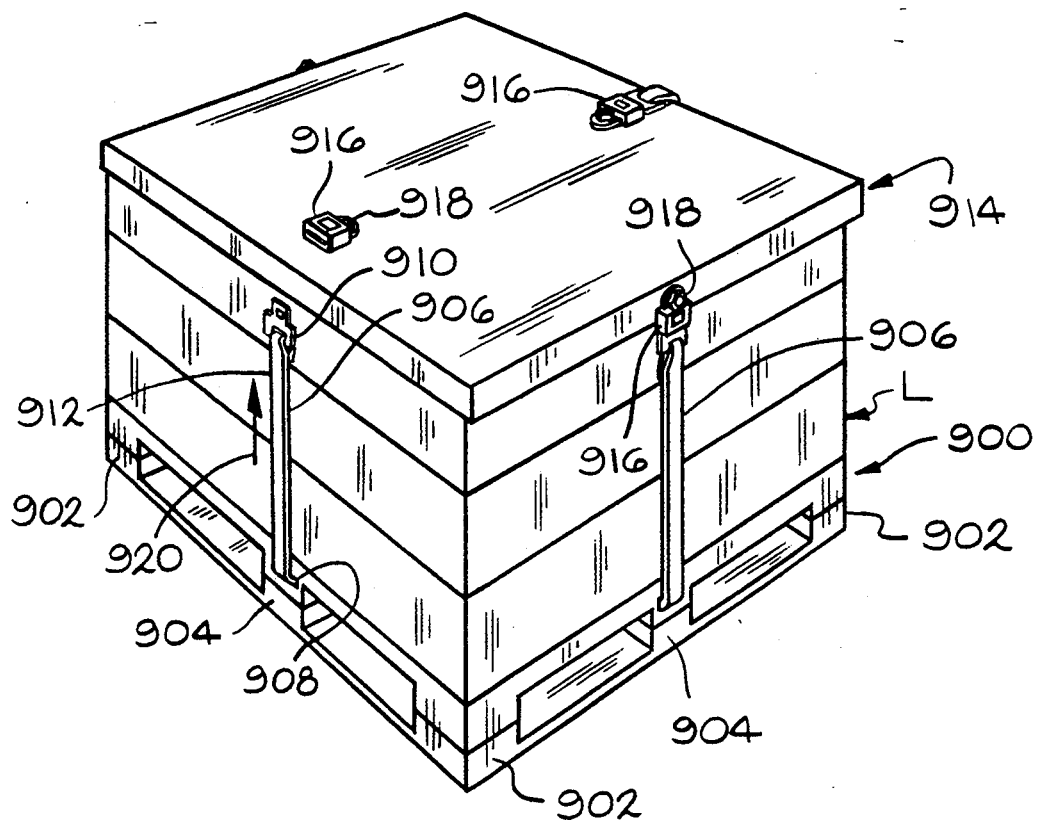
FIG. 9 is a perspective view of a prior art palletized load cover holding a load in place on a pallet.

The cover 20 is used by positioning it over a load L, as shown in FIG. 1, with the belts 28 retracted into the side feet 26 of the pallet 22. One of the belts 28 is withdrawn fully from the side foot 26 and the male buckle 32 is inserted into and locked into a female buckle 62 on one of the straps 50 or 52. The belt 28 nestles in between the side ribs 108 which terminate near the center of each side wall 114 of the cover 20. The side walls form a guide channel which positions the belt 28 essentially in the center of the side wall 114 of the cover 20. Tension is applied to the female buckle 62 tending to stretch the strap 50 or 52 until the female buckle 62 is approximately in the middle of the outer channel region 78. This procedure is repeated for the remaining three belts to complete the procedure. If necessary, additional tension may be applied sequentially to each end of the straps 50 and 52 to permit further rotation of the ratchet wheel 942 (FIG. 10) resulting in increased tension in the belts 28 and the straps 50 and 52. Unlike the prior art arrangement illustrated in FIG. 9 where belts 908 from opposite sides of the pallet 900 are connected to each other through the generally rigid cover 914, the cover 20 provides a means for two belts 28, from opposite sides of the pallet 22, to be connected to each other through an elastic strap 50 or 52 which has some freedom to move in a longitudinal direction on the cover 20. Consequently, in a system according to the present invention, if there is a shift in the load L tending to increase the tension in one of two opposed belts 28, the tension differential will be erased in the strap 50 or 52 due to its self adjusting properties. This results in reduced stresses in a cover according to the present invention, by comparison with prior art covers of the type illustrated in FIG. 9.

Figure 6:
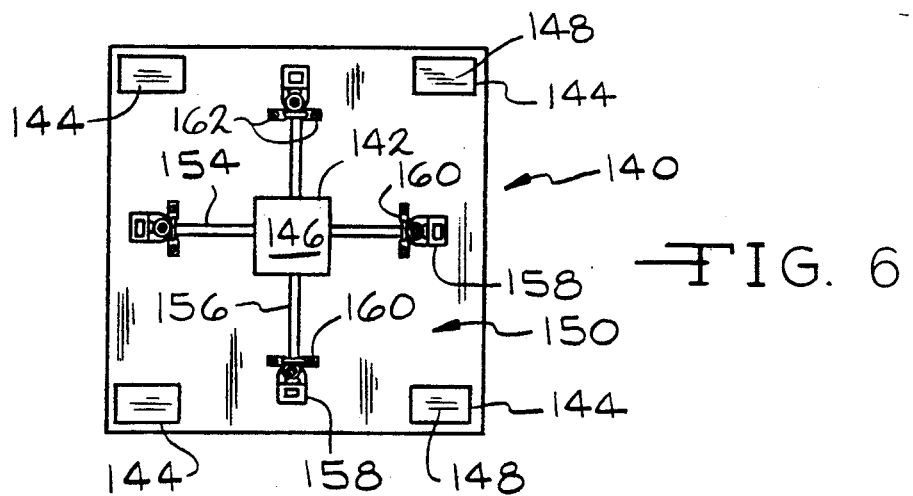
FIG. 6 is a top view of a second embodiment of a palletized load cover according to the present invention.

Referring now to FIG. 6, a second embodiment of a cover according to the invention is indicated generally at 140. The cover 140 includes a raised center portion 142 and four raised corner portions 144. Of course, the cover 140 may further include reinforcing ribs (not shown) as well as side ribs (not shown) corresponding with the side ribs 108 in the embodiment of the cover illustrated in FIGS. 1 through 5. The raised center portion has an upper surface 146 which, together with an upper surface 148 of each corner portion 144, define a first surface which is substantially planar. The cover includes a floor portion 150 which includes a lower surface 152 (FIG. 7) which defines a second surface which is substantially planar, also. Elastic straps 154 and 156 are supported on the cover 140. Female buckles 158 are secured to each end of each strap 154 and 156, in the manner described above in connection with the cover 20. The straps 154 and 156 are secured to the cover 140 by brackets 160 which, in turn, are secured to the cover 140 by threaded fasteners 162 or the like. The brackets 160 and the adjacent portion of the cover 140 define a passageway in which the straps 154 and 156 can slide freely in a longitudinal direction. The passageway is too small to accommodate the female buckles 158, so the straps 154 and 156 with the buckles 158 attached are held captive on the cover 140, while permitting limited longitudinal movement of the straps 154 and 156 in the passageways defined by the brackets 160 and the cover 140. It is preferred to position the brackets 160 on the cover 140 so that, when the straps 154 and 156 are relaxed, i.e., not stretched, and the buckles 158 at each end of the straps abut the brackets 160, there is a slight amount, an inch or so, of slack in the straps 154 and 156.

The straps 154 and 156 extend through openings (not shown) in the side walls (not shown) of the raised center portion in the same manner as described above with reference to FIGS. 1 through 5. It is preferred that straps 154 and 156 as well as the mounting hardware comprising the brackets 160 and fasteners 162 be contained between the first substantially planar surface defined by the corner and center portions 144 and 142 and the second substantially planar surface formed by the floor portion 150. It will be appreciated, however, that the portions of the straps 154 and 156 within the center portion 142 may sag downwardly, below the second plane, when the buckles 158 are not connected to pallet strap buckles. When buckles 158 are connected to pallet strap buckles and tightened, the straps 154 and 156 will be contained between the first and second surfaces.

The cover 140 is used to secure a load to a pallet in essentially the same manner described above in connection with the cover 20 shown in FIG. 1. The straps 154 and 156 will adjust in essentially the same manner as the straps 50 and 52 of the cover 20 shown in FIG. 1.

It is preferred that the straps 50 and 52 and the straps 154 and 156 have a very limited elasticity, like the Poly-Straps. The straps should be sized so that, when they are stretched by hand to be tight, they do not quite extend to the sides between which they extend. If the straps had lengths such that they extended, when stretched, beyond the sides of the cover, the buckles attached to the straps could present a hazard when the buckles are released from the strap buckles.

Figure 8:
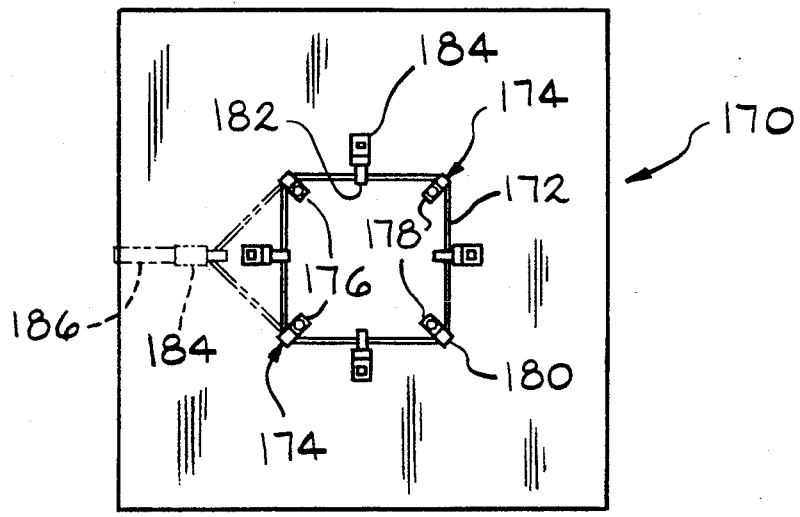
FIG. 8 is a top view of a third embodiment of a palletized load cover according to the invention.

Referring now to FIG. 8, a third embodiment of a cover according to the invention is indicated generally at 170. A strap 172, which generally forms a closed loop, is held loosely captive on the cover 170 by strap brackets 174. A first end 176 of each bracket 174 is secured to the cover with a suitable fastener 178. An opening (not shown) is provided in the other end 180 of the brackets 174 and the opening is sized to loosely receive the strap 172. The strap is elastic and, preferably, is formed of the same material as the Poly-Strap identified previously.

A buckle strap bracket 182 is secured to a buckle 184. The bracket 182 has an opening (not shown) through which the strap 172 extends and the opening is large enough to loosely hold the strap 172 while permitting the bracket 182 to move on the strap 172.

When a pallet strap, indicated at 186 in phantom lines, with a male buckle (not shown) is pulled over the pallet cover 170, and the male buckle is locked into the female buckle 184, the strap 186 is pulled causing the strap 172 to stretch to the position shown in phantom lines. It is preferred that the strap 172 be able to slide in the strap bracket 174 so that when the strap 172 is stretched, as shown in phantom lines, all of the strap 172 is stretched and not just the portion between the two adjacent strap brackets 174. In this manner, the strap 172 will self adjust and will maintain and restore equal tension, not only in belts from two opposed sides of a pallet, but in all belts connected to the strap 172.

Figure 7:
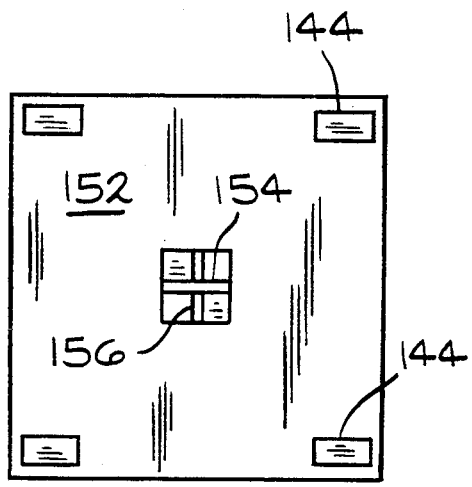
FIG. 7 is a bottom view of the load cover illustrated in FIG. 4.

A cover corresponding with the cover 140 illustrated in FIGS. 6 and 7 was vibration tested on an L.A.B. MDL #6,000 Vibration Tester, in accordance with National International Safe Transit Association (N.I.S.-T.A.) procedures for packaged products weighing over 100 pounds. The load consisted of spark plug trays loaded with spark plugs. The test entailed vibrating a table on which the loaded pallet was positioned, at a frequency sufficient to cause the loaded pallet to leave the table so that a one sixteenth inch shim can be inserted under the pallet at least four inches. The table was vibrated at this frequency for 5,900 cycles and the pallet was rotated 180 degrees and subjected to an additional 5,900 cycles. No damage to the pallet, the cover or the load was observed.

The foregoing description is intended to enable one skilled in the art to make and use the present invention. Modifications will undoubtedly occur to those skilled in the art which are not described above but fall, nonetheless, within the spirit and scope of the invention as it is defined in the appended claims.

What is claimed is:

1. A palletized load cover for securing a load having a given height to a pallet which has connected to it at least two belt spools, each with a belt having a first end connected to the spool and a distal end, the spool including means for locking the belt, when unwound, against further unwinding, each belt having a length, when unwound from the spool, sufficient to extend from the sides of the pallet a distance greater than the given height, and a connector attached to the distal end of each belt, said cover comprising a substantially planar cover body having an upper surface and a lower surface, said body having a length and a width corresponding substantially with those of the pallet, a first elastic strap having a given length and having first and second ends, a connector secured to each of said first and second ends, each of said connectors being operable to releasably connect to the connectors on the distal ends of the pallet belts, guide means connected to said cover body for holding said first strap loosely captive, on or adjacent to said upper surface of said cover body, and for preventing substantial lateral movement of said strap while permitting limited longitudinal movement of said strap relative to said cover body and stop means for preventing said strap from being removed from said cover.

2. The palletized load cover claimed in claim 1 which further includes means defining a first substantially planar surface and means defining a second substantially planar surface and wherein said strap and said strap connector are maintained between said first and second surfaces when said strap is taut.

3. The palletized load cover claimed in claim 1 which further comprises a second elastic strap having a given length and having first and second ends, a connector secured to each of said first and second ends, each of said connectors being operable to releasably connect to the connectors on the distal ends of the pallet belts, and guide means connected to said cover body for holding said second strap substantially perpendicular to said first strap and for holding said second strap loosely captive, on or adjacent to said upper surface of said cover body, and for preventing substantial lateral movement of said second strap while permitting limited longitudinal movement of said second strap relative to said cover body.

4. A pallet and a palletized load cover for securing a load having a given height to said pallet, said pallet comprising
  at least two belt spools connected to said pallet, said spools having belts which, when unwound from the spool, are locked against further unwinding, said belts having a length, when unwound, sufficient to extend from the sides of the pallet a distance greater than the given height, and a connector attached to the distal end of each belt,
said cover comprising
  a substantially planar cover body having an upper surface and a lower surface, said body having a length and a width corresponding substantially with those of said pallet,
  a first elastic strap having a given length and having first and second ends,
  a connector secured to each of said first and second ends, said connector being operable to releasably connect to the connectors on the distal ends of the pallet belts,
  guide means connected to said cover body for holding said strap loosely captive, on or adjacent to said upper surface of said cover body, and for preventing substantial lateral movement of said strap while permitting limited longitudinal movement of said strap relative to said cover body and
  stop means for preventing said strap from being removed from said cover.

5. The palletized load cover and pallet claimed in claim 4 which further includes means defining a first substantially planar surface and means defining a second substantially planar surface and wherein said strap and said strap connector are maintained between said first and second surfaces when said strap is taut.

6. The palletized load cover claimed in claim 4 which further comprises a second elastic strap having a given length and having first and second ends, a connector secured to each of said first and second ends, each of said connectors being operable to releasably connect to the connectors on the distal ends of the pallet belts, and guide means connected to said cover body for holding said second strap substantially perpendicular to said first strap and for holding said second strap loosely captive, on or adjacent to said upper surface of said cover body, and for preventing substantial lateral movement of said second strap while permitting limited longitudinal movement of said second strap relative to said cover body.

7. A palletized load cover for securing a load having a given height to a pallet which has connected to it at least two belt spools, each with a belt having a first end connected to the spool and a distal end, the spool including means for locking the belt, when unwound, against further unwinding, each belt having a length, when unwound from the spool, sufficient to extend from the sides of the pallet a distance greater than the given height, and a connector attached to the distal end of each belt, said cover comprising
  a substantially planar cover body having an upper surface and a lower surface, said body having a length and a width corresponding substantially with those of the pallet,
  an elastic strap constituting an essentially closed loop,
  a plurality of strap brackets secured to said cover and holding said strap loosely captive on said cover in a loop shape, said strap brackets supporting said strap on said cover but permitting the strap to slide through said strap brackets,
  at least two connectors, each of said connectors being operable to releasably connect to the connectors on the distal ends of the pallet belts, and
  at least two connector strap brackets secured to said connectors and supporting said connectors on a portion of said strap for movement on said strap between adjacent strap brackets.

* * * * *

UNITED STATES PATENT AND TRADEMARK OFFICE
CERTIFICATE OF CORRECTION

PATENT NO. : 5,423,428
DATED : June 13, 1995
INVENTOR(S) : John C. Selz

It is certified that error appears in the above-identified patent and that said Letters Patent is hereby corrected as shown below:

Column 3, Line 60 should read
    pallet 22 is a conventional pallet which has corner feet
Column 5, Line 49 should read
    surface 102 (FIGS. 1 and 2) of a corner section 104
Column 5, Line 50 should read
    provided in each corner of the cover 20. In fact, it is
Column 5, Line 59 should read
    of the corner portions 104 and, further, that the upper
Column 6, Line 1 should read
    ribs 64 and the corner sections 104, define a first surface
Column 6, Line 61 should read
    142 and four raised corner portions 144. Of course, the
Column 6, Line 67 should read
    upper surface 148 of each corner portion 144, define a
Column 7, Line 31 should read
    defined by the corner and center portions 144 and 142

Signed and Sealed this

Seventeenth Day of October, 1995

*Attest:*

BRUCE LEHMAN

*Attesting Officer*      *Commissioner of Patents and Trademarks*